United States Patent [19]

Paxton

[11] 3,879,496

[45] Apr. 22, 1975

[54] LOW RUBBER, HIGH-FLOW AND HIGH IMPACT ABS PLASTICS, IMPROVED RUBBER TOUGHENER FOR PRODUCING SAME, AND METHOD OF MANUFACTURE

[75] Inventor: Thomas R. Paxton, Akron, Ohio

[73] Assignee: The B. F. Goodrich Company, New York, N.Y.

[22] Filed: Apr. 13, 1972

[21] Appl. No.: 241,063

Related U.S. Application Data

[63] Continuation-in-part of Ser. No. 142,740, May 12, 1971, abandoned.

[52] U.S. Cl. .......... 260/880 R; 260/876 R; 260/892
[51] Int. Cl. ..................... C08f 19/08; C08f 41/04
[58] Field of Search ............. 260/880 R, 892, 876 R

[56] References Cited
UNITED STATES PATENTS

| | | | |
|---|---|---|---|
| 2,614,093 | 10/1952 | Wheelock | 260/892 |
| 2,677,674 | 5/1954 | Daly | 260/892 |
| 3,068,191 | 12/1962 | Seijo et al. | 260/892 |
| 3,657,172 | 4/1972 | Gallagher et al. | 260/876 |
| 3,661,994 | 5/1972 | Hwa et al. | 260/876 |
| 3,663,656 | 5/1972 | Ford et al. | 260/876 |

FOREIGN PATENTS OR APPLICATIONS

| 1,063,439 | 3/1967 | United Kingdom | 260/880 |
|---|---|---|---|

*Primary Examiner*—John C. Bleutge
*Attorney, Agent, or Firm*—Robert W. Wilson

[57] ABSTRACT

Improved ABS plastics are disclosed which exhibit high impact resistance at lower rubber content than has heretofore been utilized while also exhibiting good flow properties, all by reason of containing an improved form of rubber toughener. The improved ABS toughener comprises a butadiene rubber in the form of large particles containing numerous small, hard particles of an insoluble vinyl aromatic reinforcing resin and having a graft overpolymerized coating of a styrene/acrylonitrile (SAN) copolymer resin. The size of the reinforcing resin particles is critical and should be between about 150 and about 800 A in average diameter, more preferably between about 200 and about 600 A, and most preferably between about 200 and about 400 A in average diameter. Also critical is the size and resin content of the rubbery substrate particles which should be not less than about 750 A, more preferably between about 1,000 and about 3,000 A, and most preferably between about 1,000 and 2000 A in average diameter at rubber-to-reinforcing resin weight ratios between about 20:1 and about 5:1, more preferably between about 15:1 and about 8:1, in order to yield both impact resistance and improved melt flow properties. The proportion of graft polymerized SAN on such large rubber substrate particles is not particularly critical and can range from as much as high 95 parts/wt. of total resin (SAN + reinforcing resin) on 5 parts/wt. of rubber (less reinforcing resin) to as low as 30 to 40 parts/wt. of SAN (less reinforcing resin) per 100 parts/wt. of rubber less reinforcing resin, more preferably between about 50 and about 500 parts/wt. of SAN for every 100 parts/wt. of rubber as reinforced rubber. On dilution of the SAN-coated toughener with rubber-free SAN, ABS plastic formulations are obtained which contain from about 5 to about 25%/wt. more preferably between about 10 and about 18%/wt. of rubber based on total polymer content and exhibit a unique combination of high impact strength and high melt flow.

10 Claims, No Drawings

LOW RUBBER, HIGH-FLOW AND HIGH IMPACT ABS PLASTICS, IMPROVED RUBBER TOUGHENER FOR PRODUCING SAME, AND METHOD OF MANUFACTURE

RELATED APPLICATION

The present application is a continuation-in-part of my copending application, Ser. No. 142,740, filed May 12, 1971 now abandoned.

PRIOR ART BACKGROUND

ABS (acrylonitrile/butadiene/styrene) plastics are old and the art of making them has been energetically developed by numerous competing manufacturers all over the world. The patent literature on ABS plastics is quite voluminous. U.S. Pat. No. 2,820,773 discloses the preparation of ABS by graft polymerizing styrene/acrylonitrile resins (SAN) on a latex of a butadiene-1,3 copolymer synthetic rubber to produce a product containing from 20 to 75%/wt. of the rubber and 80 to 25%/wt. of SAN. Such polymerization product is then blended with additional SAN resin to produce an ABS plastic formulation having impact resistance and containing between about 20 and about 30%/wt. of rubber based on total polymer, see also U.S. Pat. No. 3,238,275.

U.S. Pat. No. 3,238,275 discloses the overpolymerization of SAN onto a polybutadiene latex to produce an ABS plastic having good impact resistance at low temperatures. The patent claims "excellent" although unspecified impact resistance in formulations containing from 20 to 60%/wt. of the polybutadiene rubber.

British Pat. No. 1,063,439 shows that SAN-on-polybutadiene ABS plastics similar to those of U.S. Pat. No. 3,238,275 have higher impact strength if the polybutadiene latex is agglomerated before the SAN is grafted thereon. The proportions of rubber in this British patent appear to be normal for ABS. The "higher" impact in the British patent is demonstrated by so-called "Charpy 76°F" procedure which is similar to the ASTM Izod procedure except for use of a notch-free sample whereas the Izod procedure employs a pre-notched sample. Since a notched sample will fracture at much lower fracture energies than a corresponding notch-free sample, the impact resistances shown in the British patent are quite modest for ABS plastics containing such high rubber concentrations.

An article in the Encyclopedia of Polymer Science and Technology Vol. 1 (1964), (Interscience, NYC) starting on page 436, particularly in Table I, page 437, shows the properties of the various types of ABS plastics. ABS which exhibits 5 – 9 ft.lbs/in. Izod impact resistance are classified as the "extra-high impact" and "low-temperature" versions of ABS presumably containing about 20%/wt. or more of rubber. "Medium-impact" versions of ABS of unstated rubber content are said to exhibit Izod impact values of 1.5 – 4.0 ft.lbs/in. These data and the above patents indicate that the rubbery toughener phase in heretofore known ABS plastics is rather inefficiently utilized as compared to other rubber-toughened high impact plastics. Such high levels of unsaturated rubbers are deleterious to the resistance of the plastic to environmental degradation, and to the melt flow characteristics therof.

Although not stated in the above-identified literature, there has grown up in the ABS art, the concept that at least a minimum amount of grafting is necessary between the polybutadiene and the overpolymerized SAN, such grafting being measured by dissolviong away ungrafted, soluble SAN material in acetone, and treating the acetone-insoluble material as grafted SAN-on-polybutadiene. Products made by the prior art procedures frequently show in photomicrographs the presence of occluded resinous SAN particles inside discrete rubbery masses, see the article entitled "Morphological Aspects of ABS Plastics" by Koichi Kato in Japan Plastics, Apr. 1968, pages 6 – 17. Such occluded SAN particles introduced during grafting usually are of highly heterogenous shape, vary in number from rubber particle to particle, have wide range of size but primarily are quite large, and as a result vary considerably in particle to particle rubber:resin proportions. It may be, in view of the disclosures herein, that the art has been confused by the simultaneously-exerted effects of what may or may not be authentic grafting and what may be variation in the resin-reinforcement action of the occluded SAN.

U.S. Pat. No. 3,238,172 discloses the production of an internally-reinforced latex by freeze-agglomerating or really freeze coagglomerating a mixed latex of a synthetic rubber and of a hard resinous high styrene resin (90 parts/wt. of styrene and 10 parts/wt. of butadiene). The resulting agglomerated reinforced resin is concentrated and employed to make latex from rubber of improved resiliency.

British Pat. No. 939,482 discloses a method of agglomerating a synthetic rubber latex by adding a solvent to the latex and freeze-agglomerating the resulting solvent-containing latex. The resulting latex is also employed to make latex foam rubber.

ABS plastics involve a complex compromise between ease of processing (i.e. good melt flow index) and toughness or impact strength. Formerly, improved melt flow characaeteristics of high impact ABS was obtainable most readily only by reduction in the molecular weight of the SAN resinous matrix component. However, such higher melt flow products seldom exhibit the best toughness characteristics. ABS plastics having maximized toughness, high melt flow characteristics and improved resistance to degradation are badly needed.

SUMMARY OF INVENTION

The present invention relates to an improved low rubber content ABS plastic, to an improved high-rubber toughener masterbatch to making same, and to an improved method of making these products.

I have discovered a way in which the proportion of rubbery toughener material in ABS plastic formulations may be lowered significantly thereby obtaining simultaneously an improvement in the melt flow characteristics and resistance to environmental degradation of the formulation, all without sacrifice of impact resistance. I have also discovered an improved procedure for making ABS tougheners.

In accordance with the present invention, I have discovered that the efficiency of a rubbery butadiene-1,3polymer as a toughener in ABS is markedly increased if the rubber is reinforced with a large number of very small, hard, insoluble particles (hereinafter "reinforcing particles") of resin uniformly distributed in the rubber phase, which rubbery phase is in turn distributed substantially uniformly in the hard SAN continuous phase or matrix as large particles of at least 750

A in diameter more preferably between about 1,000 and about 3,000 A, and most preferably between about 1,000 and about 2,000 A in diameter.

The method of the present invention comprises introducing preformed reinforcing resin particles into the rubber before the latter is associated with the SAN material. In so doing, I am able accurately to predetermine the size and number of such reinforcing particles, the weight proportion of such reinforcing particles relative to the rubber, and also the uniformity of dispersion of such reinforcing in the rubber thereby making most efficient use of the reinforcing resin and heightening the efficiency of the rubber as a toughener. It is believed that a rubber phase of such description is itself materially toughened by filler type reinforcement without the need of excessive molecular weight, crosslinking or gelatin, or any of the other ways in which a rubber is made tough, the use of any of the latter which might impair processability of the final ABS formulation.

Such method involves enmeshing, engulfing or dispersing the numerous small, hard reinforcing particles in rubber while the rubber per se exists in aqueous dispersion as a latex. There are several ways in which I have accomplished this. One such equivalent procedure involves polymerizing butadiene-1,3 monomer in an aqueous dispersion containing prepolymerized small latex particles of crosslinked, insoluble and low swell hard reinforcing resin. The latter method is perhaps most efficient in securing uniform dispersion of the reinforcing particles in the rubber but, however, is subject to certain particle/size/rate/viscosity/soap limitations which make it necessary to carry out a subsequent agglomeration of the resin-containing rubber particles to increase their average size to the point where melt flow is acceptable. The overpolymerization technique offers, on the other hand, the further possibility of inducing graft linkages between the hard reinforcing particles and the rubber thereby possibly heightening the reinforcement effect and rendering the state of resin dispersion more resistant to change during later exposure to high temperature shear thereby broadening the plastic processing range.

The second alternative dispersion technique is to mix a small particle latex of the prepolymerized reinforcing resin with a preformed small-to-medium particle latex of the butadiene rubber and effect a coagglomeration thereof. Such technique offers time and cost savings and the ability to deliver in one step both good dispersion and the desired large particles at rubber-resin weight ratios and particle size values where the overpolymerization technique is less efficient and most time consuming. There is some indication that coagglomeration can employ with success less highly crosslinked reinforcing resin particles than can the over-polymerization technique. However, the coagglomeration technique becomes difficult when employing reinforcing particles in the upper end of the range herein disclosed. Thus, an intelligent choice of these two procedures allows one efficiently to make excellent products over the full range of operable size-composition variables disclosed herein.

I have found that the reinforcing resin particles should be at least partially crosslinked so as to resist dissolution and/or the swelling effects of monomeric materials and/or solvents to which such particles are or can be exposed during the various subsequent stages of manufacture and/or use. Since the reinforcing resin particles are very small with large exposed surface and are subjected to one or more extended procedures in aqueous media of relatively elevated pH, I have also found that the hard reinforcing resin preferably is hydrocarbon in nature so as to be most resistant to hydrolysis. The best reinforcing resin is a vinyl aromatic hydrocarbon copolymer such as that produced by copolymerizing sytrene containing small proportions of divinyl benzene.

I have further found that there is a relatively narrow range of proportions for the rubber and reinforcing resin in the rubber substrate particles. It is possible to employ rubber:resin weight ratios from about 20:1 to about 5:1, more preferably from about 15:1 to about 8:1. At the higher resin proportions below a rubber:resin weight of ratio of 5:1, agglomeration becomes more difficult and erratic such that the agglomeration ratio is smaller whereas with a rubber:resin weight ratio of above 20:1 there will be little observable value to the use of such a small proportion of reinforcing resin.

In my earlier copending application, I described these same effects in terms of a required range of thickness of a coating or "shell" of rubber on the resin particles. While such completely- and uniformly-coated resin particles are ideal they may not be attained in all instances nor do they appear required. The rubber:resin weight ratios and particle sizes of this application, on the one hand, and the "shell" thickness concepts of my earlier application are believed to be related to the same dispersion phenomenon, namely, the size and number of reinforcing particles, the "packing density" and/or the average center-to-center distances between reinforcing particles. Calculated surface-to-surface distances between reinforcing particles in my better products seem to be only slightly larger, on the average, than the reinforcing resin particle diameter values.

The described resin-reinforced rubbery material, when prepared as particles averaging at least 750 A in average diameter, more preferably between about 1,000 and about 3,000 A and most preferably between about 1,000 and 2,000 A, forms a substrate onto which SAN is grafted by overpolymerization in aqueous dispersion. The proportion of total resin (SAN + reinforcing resin) relative to rubber in the product of this SAN overpolymerization step can vary quite widely. Thus, it is possible to produce the final ABS proportions directly in the polymerization vessel by depositing on the substrate sufficient SAN to constitute between about 80 to about 95%/wt. of SAN based on the total weight of polymeric constituents. Such a procedure is wasteful of polymerization capacity and it is preferred to deposit much smaller proportions of SAN to produce what is, in effect, a toughener masterbatch which is later dilutable with rubber-free SAN to reach the lower rubber proportions of the ABS final products of this invention. When so doing it is necessary, as a minimum, to deposit only so much of the SAN as to produce a dry, nonsticky product which can be coagulated, filtered, dried and handled by conventional techniques. The minimum proportion of overpolymerized SAN needed is thus between about 30 to 40 parts/wt. of SAN per 100 parts/wt. of rubber (less reinforcing resin). Such a toughener masterbatch subsequently can be diluted with from 2 to 4 or 5 times its own weight of rubber-free SAN, depending on the rubber content desired in the final plastic formulations. Most commonly, there will be desposited from about 50 to about 500 parts/wt.

of overpolymerized SAN per 100 parts/wt. of rubber (less reinforcing resin) and more preferably between about 40 and about 200 parts/wt. of SAN per 100 parts/wt. of rubber (less reinforcing resin). The resulting toughener masterbatch is saleable as such to resin formulators who do their own compounding. The ABS manufacturer who produces and sells ABS plastic formulations may employ a single such masterbatch to produce a number of ABS plastics employing various rubber levels and widely varying compounding ingredients.

While I do not wish to be bound by theory, my work with overpolymerization of SAN onto polybutadiene indicates that some grafting does occur and appears necessary for good processing quality in the plastic. However, too much grafting also can reduce the melt index, and whether this reduction is due to too much grafting per se or to too much occluded SAN in the rubber particles is most difficult to determine. I have noted in potomicrographs of some of my better products no particles resembling the irregular occluded SAN particles of prior art products. No explanation for this absence is known for there is no certain test to demonstrate either the presence or absence of SAN in such a product. It could be that the presence of the small reinforcing particles in the substrate particles of this invention has modified or nucleated the SAN occlusion mechanism causing the formation of smaller SAN occulusions.

The ABS plastics and toughener masterbatch products of this invention differ from corresponding prior art products in a compositional sense by containing a third polymeric ingredient, namely, the reinforcing resin. The former also differ in a physical sense in the size, shape, number and distribution of the insoluble reinforcing resin particles in the rubber phase which appear as small uniform and numerous pinpoints of light in photomicrographs. The ABS plastics of this invention differ from those of the prior art in their better flow characteristics at equivalent or better impact values.

The unique toughener masterbatch of this invention cannot be duplicated by known techniques by direct overpolymerization techniques not involving an agglomeration or coagglomeration step. I have attempted to do so and found that direct growth of very large rubber particles, even in multiple-step overpolymerization of the rubber producing monomer, suffer from inherent rate limitations. For example, if it is attempted to grow large resin reinforced rubber particles (i.e. 1500 A or larger) by the overpolymerization of butadiene rubber on the particles of a reinforcing resin latex, the polymerization rate is very, very slow, often requiring 4 to 5 days or more to reach the desired size. If the large particles are achieved by overpolymerization, the final ABS plastic produced from such a laboriously-produced masterbatch is lacking in both toughness and adequate flow characteristics. Likewise, if one attempts to make such large rubbery substrate particles by starting with larger reinforcing resin particles, the butadiene overpolymerization is slower than with smaller particles at equivalent rubber:resin weight ratios but again final ABS formulations embodying the resulting toughener are deficient in toughness and flow properties. The reasons for these differences between the agglomerated and directly-grown types of products are not fully understood.

DETAILED DESCRIPTION

GENERAL

The terms "crosslinked" and "insoluble" as applied to the reinforcing resin particles mean a resinous material which is sufficiently gelled or crosslinked as to resist dissolution and/or swelling in monomers and solvents to which it later may be exposed. Photomicrographs of my new products indicate the reinforcing resin particles are present in the original size and generally spherical shape expected in latex particles.

Throughout this specification repeated use is made of "toughener masterbatch" or "masterbatch" in distinction to the terms "ABS plastic" or "final ABS plastic formulation". The term toughener masterbatch or masterbatch is employed as meaning an unmasticated polymerizaton product wherein a SAN type resin is overpolymerized on a rubbery substrate but contains generally more than about 15 to 20 parts/wt. of rubber per 100 parts/wt. of total resinous components. ABS Plastic or final ABS plastic formulation means a compounded and/or diluted product containing from about 5 to about 25 parts/wt. of rubber per 100 parts/wt. of total resinous ingredients and evidences, after working and mastication, toughness and good melt flow characterization.

The term "polymerization in aqueous dispersion" means the step of polymerizing a liquid monomeric material under the action of a water-soluble free radical catalyst while dispersed colloidally in an aqueous medium containing a dispersing or emulsifying agent and producing a latex-like liquid product. The terms "overpolymerization in aqueous dispersion" or "graft polymerization in aqueous dispersion" mean the step of polymerizing a liquid monomeric material in an aqueous medium containing (1) a dispersing or emulsifying agent and (2) preformed latex particles of a polymeric product. The difference intended by the word "graft" prefixed to "overpolymerization" is that the preformed latex particles have a structure and chemical composition offering the possibility of graft linkages occurring between the material of the preformed latex particles and the second overpolymerized polymer. Both "over" and graft polymerization also imply that the polymerization proceeds, in accordance with well-established concepts such as those in U.S. Pat. No. 2,520,959, on the polymeric particles already present to the substantial exclusion of particle initiation. As is shown in the above-mentioned U.S. Pat. No. 2,520,959, the disclosure of which is incorporated herein by reference, control of the soap or emulsifier coverage on the growing latex particles below the theoretical monomolecular soap film, suppresses new particle initiation since there is little free soap in the medium to form micelles or nuclei for new particle initiation.

In the description to follow, there will be recited average dismeters (number average) of latex particles expressed in A. Such sizes are as calculated based on a standard soap titration procedure. Such calculation of latex particle size values are based on assumed perfectly spherical latex particles all of the same average size, which they are not, and therefore such calculated values are average values from which individual particles may differ. Such errors as may be present, however, appear to be consistent and (in a series of closely similar determinations on similar latices) sizes so determined probably are reasonably related to actual average sizes. In any event, the calculated latex particle size values herein appear meaningful as respects the development of impact strength and melt flow and also for the relatively more efficient use of the rubbery phase in the products of this invention.

REINFORCING RESIN LATICES

The reinforcing resin particles of this invention are prepared by polymerizing in aqueous dispersion a monomeric material consisting of at least 60%/wt. of a (mono) vinyl aromatic monomer, not more than about 39.5%/wt. of one or more monovinylidene monomers (i.e. those containing a single $CH_2=C<$ group per molecule) copolymerizable in aqueous dispersion with the vinyl aromatic monomer in question, and from about 0.5% to about 4%/wt., more preferably from about 1% to about 2%/wt., of a nonconjugated crosslinking monomer copolymerizable in aqueous dispersion with the vinyl aromatic monomer and containing at least two nonconjugated $CH_2 = C<$ groups per molecule.

The monovinyl aromatic monomers useful in preparing reinforcing resins include styrene, alpha-methyl styrene and other nuclear-alkylated styrenes such as ortho-, meta- and para-methyl styrenes, the corresponding ethyl styrenes, and any other monovinyl aromatic monomer containing a single

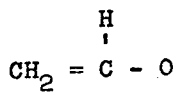

group and any of nuclearly-substituted alkyl groups, halogen atoms and alkoxy groups. Styrene is the most preferred vinyl aromatic monomer.

Monovinylidene monomers which may be copolymerized in small proportions with the monovinyl aromatic monomer and the crosslinking monomers to produce reinforcing resin particles include acrylonitrile (preferred), methyl methacrylate, vinyl chloride, vinylidene chloride, methyl acrylate, vinyl acetate and many others. Thus, the reinforcing resin may be, if desired, a crosslinked styrene/acrylonitrile interpolymer.

Best reinforcing resin latices are achieved with a two-component monomeric mixture consisting of styrene and the crosslinking monomer, most preferably a hydrocarbon crosslinking monomer, such as divinyl benzene.

CROSSLINKING MONOMERS

Nearly any monomeric material which is free of conjugated unsaturation and contains at least two nonconjugated $CH_2=C<$ groupings per molecule may be employed to crosslink and insolubilize the reinforcing resin. Divinyl benzene, divinyl naphthalene, p,p'divinylbiphenyl, p,p'-diisopropenylbiphenyl, the vinyl cyclohexenes and other polyvinyl- and polyallyl-substituted hydrocarbons are relatively inexpensive and available materials known to be good crosslinking agents for styrene-type monomers. Fusible, soluble, low molecular weight homopolymers of divinyl benzene and soluble 1,2-polybutadienes high in side chain vinyl groups may also be employed.

Another useful class of crosslinkers are the esters of an unsaturated alcohol and an unsaturated carboxylic acid, particularly of the alpha-beta unsaturated monocarboxyl acids such as allyl acrylate, allyl methacrylate, vinyl acrylate, vinyl methacrylate, and others as well as diallyl maleate, diallyl phthalate, and many others. Other ester-type crosslinkers are the polyesters of an alpha-beta unsaturated monocarboxylic acid such as acrylic or methacrylic acids and a polyhydric alcohol, particularly of the alkylene glycol series, which polyesters contain from 2 to 6 acrylic or methacrylic acid groups per polyester molecule. Monomers of the latter type include ethylene glycol diacrylate (sometimes referred to herein as "DEGDA"), ethylene glycol dimethacrylate, trimethylene glycol diacrylate, butylene glycol diacrylate, and others and similar polyesters such as trimethylol propane triacrylate, trimethylol propane trimethacrylate, glyceryl diacrylate, and many others.

Another preferred class of crosslinking monomers of known ability to resist hydrolysis are the polyalkenyl polyethers of polyhydric alcohols which contain from 2 to 6 of the alkenyl ether groups per molecule each in the terminal or vinylidene structure $CH_2 = C<$. Such polyether monomers are produced, for example, by the Williamson synthesis wherein a suitable alkenyl halide such as allyl bromide or vinyl bromide is reacted with an alkaline solution of a polyhydric alcohols derived from sugars and related carbohydrates such as sucrose, maltose, fructose and the like. A particularly effective and available monomer of this class having demonstrated crosslinking ability is a polyallyl ether of sucrose containing an average of 2, 3, 4 or more allyl ether groups per sucrose molecule.

GRAFTING/CROSSLINKING MONOMERS

The crosslinking monomer may have not only the ability to insolubilize the monovinyl aromatic copolymer but also the ability to only partially react during polymerization leaving at least a few unreacted polymerizable groupings available as sites for grafting of the rubber onto the surface of the insoluble reinforcing resin particles. Some of such monomers contain at least two dissimilar nonconjugated and terminal vinylidene polymerizable groupings which demonstrate differing reactivities toward the monovinyl aromatic monomer during polymerization. One class of such monomers is selected from the class consisting of the vinyl and allyl esters of unsaturated carboxylic acids illustrated by allyl methacrylate in which the allyl alcohol group

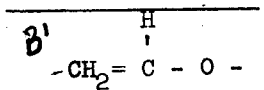

is known to be somewhat slower to polymerize than the alpha-methyl-substituted vinylidene group

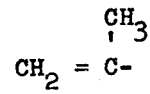

of the methacrylic acid portion of the ester. Still other monomers of this class include vinyl acrylate, vinyl methacrylate, allyl acrylate, diallyl itaconate, the monoallyl and diallyl maleates, the monoallyl and diallyl fumarates, diallyl diglycollate, allyl crotonate, cinnamyl acrylate, crotyl acrylate, crotyl methacrylate, and others. Allyl methacrylate is a preferred crosslinking/grafting monomer for the preparation of grafted products.

Still another class of monomers possessing potential graft-inducing ability are the polyalkenyl polyether types defined above which contain a plurality of allyl or vinyl ether groupings which polymerize independently in some cases leaving unreacted polymerizable groupings as potential graft sites.

Most preferred grafting/crosslinking monomers are those selected from the class consisting of the vinyl and allyl alcohol monoesters of alpha-beta unsaturated monocarboxylic acids such as are defined above.

Most preferred crosslinkers where potential grafting is not involved and maximum resistance to hydrolysis is desired are the nonconjugated polyvinyl- and polyallyl-substituted hydrocarbon monomers as defined above such as divinyl benzene.

PROCEDURE-REINFORCING RESIN LATICES

These latices are small particle latices made by polymerizing the monomeric mixture in aqueous dispersion employing a water-soluble, free radical (peroxygen) catalyst and water-soluble dispersants which are strongly preferred to be of the fatty acid soap types. The proportion of monomer, dispersant and catalyst should be high at the start of the polymerization to initiate a large number of particles early in the reaction. In some cases, it may be desirable to employ proportional addition of catalyst and dispersant during the reaction to favor growth of the first-initiated particles and suppress continued particle initiation thereby obtaining a latex product of narrower and predetermined range of small particles.

The polymerization to produce the reinforcing resin latex is carried out with agitation under an inert atmosphere at any temperature in the range of from about 20° to about 80°C more preferably between about 35° and about 65°F. Where overpolymerization with butadiene-1,3 is to be employed, the polymerization of the reinforcing resin preferably should be carried to as high a conversion as possible to simplify or eliminate removal of residual monomer and insure maximum insolubility in the seed particles. Removal of unreacted styrene type monomer is not necessary where reinforcing resin and rubber latice are coagglomerated, since the subsequent graft-polymerization with SAN monomers can consume residual styrene monomer in the resin whereby removal of unreacted styrene can be delayed until after the grafting step when all residual styrene can be stripped off.

If conversion is below 95%, the reinforcing resin latex may be stripped under vacuum to reduce the unreacted monomer content. Additional dispersant may be added for latex stability during stripping, but this is generally undesirable in the later agglomeration step. Also before the stripping of residual monomer it may be desirable to filter the resin latex to remove any coagulum floating in the latex.

Reinforcing resin latices, because of their small particle size, exhibit appreciable viscosities at the higher total solids contents. They are best made at moderate total solids levels of 15 to 50%/wt., more preferably from about 15% to about 35%/wt., to avoid high viscosities.

RUBBER OVERPOLYMERIZATION

Monomers Polymerized

In this procedure, a tough rubbery butadiene synthetic rubber is deposited on the reinforcing resin latex particles. For this purpose, a butadiene synthetic rubber producing monomeric material is employed containing not less than about 70%, more preferably not less than 95%/wt., of monomeric butadiene-1,3. The remainder of such monomeric material constituting not more than 30%/wt. should consist of one or more monovinylidene monomers which combine with butadiene producing rubbery copolymers. The higher the proportion of butadiene, the lower will be the brittle point and the higher the impact strength of the final ABS plastic. Most preferred is a tough, low gel polybutadiene made in the presence of modifiers from a monomeric material consisting of butadiene-1,3 at high conversion (70 – 80%) producing a rubbery, high molecular weight homopolymer of butadiene-1,3 low in gel content and having a Mooney viscosity of at least 70 ML-4 at 212°F. In the method of this invention, which involves an agglomeration procedure, it is not possible to utilize a rubber phase which is gelled to any substantial extent. It is preferred, therefore, to employ in the rubber polymerization an alkyl mercaptan type rubber "modifier" to suppress gel and permit operation at higher conversions during the rubber polymerization step.

PROCEDURE — RUBBER POLYMERIZATION

In this polymerization, the butadiene monomeric material, if desired the reinforcing resin latex, a polymerization modifier such as an alkyl mercaptan, a water-soluble free-radical catalyst, a water-soluble dispersant (in this stage sodium and potassium fatty acid soaps preferably should be employed) and other normal polymerization adjuvents such as buffers, chelators, etc., are combined in a reaction vessel under an inert atmosphere with agitation and the reaction carried out by maintaining the temperature of the dispersion anywhere in the range of from about 5° to about 60°C, more preferably between about 5°C and about 30°C. Low temperature (5° to 30°C) polymerization with redox catalysts and mercaptan modifiers is preferred since low gel, high Mooney rubber is produced.

As indicated above, the proportion of soap present in the polymerization medium is maintained at less than saturation for a monomolecular layer, usually about one-half of surface saturation. It is generally desirable to utilize the smallest proportions. The idea here is to cause the rubber polymer to deposit to the extent possible on the resin particles or already present rubber particles to the substantial exclusion of new particle initiation.

It is preferred to terminate the rubber polymerization by shortstop addition when 60 to 85%, more preferably 70 – 80%, of the monomer has polymerized in order to assure low gel and a rubbery characteristic in the deposit. The proportion of polymerization modifier or chain-terminator such as an alkyl mercaptan to be utilized should prevent gel formation yet be low in the range of 0.1 to 0.3 parts/wt. per 100 parts/wt. of monomer since it is desirable that the rubber be high in molecular weight. In the latter context, such rubber should have a Mooney viscosity of at least 70 to 100 or more (ML 4 at 212°F).

The polymerization of rubber, or overpolymerization of rubber on the resin particles, usually is terminated at the desired conversion by addition of a "shortstop" to kill the catalyst and prevent undesired polymerization during subsequent storage and/or handling such as removal of residual monomers by steam stripping under vacuum. Lastly, the latex product preferably should be filtered before agglomeration according to the process of this invention.

AGGLOMERATION — COAGGLOMERATION

There are many ways to agglomerate the first-stage latex to produce the large particle substrate latex, or to effect coagglomeration of the reinforcing resin and rubber latices. Among them are controlled salt- or alcohol-addition to destabilize or precipitate a portion of the dispersant (this method being primarily applicable with latices made with fatty acid soaps). Another method known as chemical agglomeration wherein controlled, small amounts of a colloidally-active, high molecular weight, water-soluble additives such as polymerized vinyl methyl ether are added to the latex with heating and/or with or without salt-type electrolytes. However, most of these methods result in increased residue content, particularly electrolytic residue in the product which are difficult to remove and their presence results, usually, in decreased chemical and heat stability of the end product. More preferred are mechanical agglomeration and freeze-agglomeration neither of which require additives and produce a cleaner product.

A latex is agglomerated mechanically by passing the latex through a homogenizer or colloid mill wherein it is passed through small orifices at high pressures of 500 - 1,000 psi or more whereby it is subjected to intense shear causing partial or controlled agglomeration. The latex may be passed through the apparatus one or more times while monitoring the surface tension of the latex to determine when the desired degree of agglomeration is achieved (agglomeration liberates dispersant or soap since less soap is required for larger latex particles). It is the latter increase in free soap during agglomeration which causes problems when utilizing very small reinforcing resin.

Freeze-agglomeration is the preferred method since it is much more readily controlled by varying both the freeze temperature and the time during which the frozen condition subsists. As indicated in U.S. Pat. No. 3,031,427 the disclosure of which is incorporated herein by reference, a latex is freeze-agglomerated by brining the latex into contact with the surface of a chilled metal surface such as that of a slowly rotating drum maintained at a temperature below the freeze point of the latex, usually in the range of from about −10° to about −30°C, more preferably from about −15° to about −25°C, whereby the roll acquires a layer of solid, frozen latex. Such frozen layer is scraped off the drum as by a doctor knife and delivered to a collection vessel where it can be allowed to remain in the frozen condition if additional freeze time is required. The latex is then thawed. The thawed latex usually is whiter in appearance than the original latex. Although not required, the remelted latex may be recycled one or more times to the freeze durm to achieve greater agglomeration. For use in this invention, single pass agglomeration at freeze temperatures of −30° to −10°C and freeze hold-up times of a few (1 to 10) minutes usually will be sufficient. When employing freeze-agglomeration, it is preferred to employ fatty acid soaps and low gel in the rubber phase.

The agglomerated latex must contain particles averaging at least about 750 A (number average). Better yet, the particles in the agglomerated latex should average between about 1,000 and about 3,000 A in diameter. Most preferred is between about 1,000 and about 2,000 A in average diameter. The agglomerated latex usually will contain at least a few particles up to 4,000 A or more in diameter.

In the coagglomeration step where a latex of the hard, crosslinked reinforcing resin is blended with the rubber latex and resulting mixed latex coagglomerated, the agglomeration ratio (ratio of the size of agglomerated particles to the size of original particles) is increased if a softener or solvent is added to the blended latices before freeze agglomeration. While many hydrocarbon and other organic solvents can be employed for this purpose, it is strongly preferred to employ as such softener or solvent a monomeric vinyl aromatic hydrocarbon such as monomeric styrene. The presence of from about 20% to about 100%/wt. (based on weight of reinforcing resin) of the monomeric softener in the agglomerated latex can be allowed for in calculating the SAN monomers added in the subsequent overpolymerization of SAN, the styrene thus being consumed in production of the SAN resin and minimizing a possible monomer-or solvent- recovery step before coagulation and isolation of the final SAN-on-rubber polymerization product.

PARTICLE SIZE EFFECTS

Size of Reinforcing Particles

The size of the reinforcing resin particles has a profound effect on the impact strength of the finishes ABS plastic formulation, the impact strength being low if the reinforcing particles are too big or too small. In contrast, the size of the agglomerated rubber substrate latex particles exerts a profound effect on the melt flow properties of the finished ABS plastic formulation. Thus, with reinforcing resin particles below 150 A in average diameter there is little benefit in their use, and soap requirements are large causing difficulty through soap release as the effective average latex particle size is increased during subsequent steps of the process. At about 150 A an increase in impact strength is observed. Reinforcing particles up to 500 A or 600 A evidence this same strong impact improving effect. Further increases in reinforcing particle size in the range of 600 - 800 A produces somewhat less impact strength but which provides equal or better impact at lower rubber levels than is required in prior art products. Also, at reinforcing particle sizes above about 800 - 1,000 A coagulation difficulties are encountered during agglomeration which becomes somewhat erratic and difficult. Highest impact is achieved with reinforcing particles averaging between about 200 and about 400 A in diameter although the production of somewhat higher melt flow ABS plastic formulations may be favored, because of lowered required agglomeration ratios, employing reinforcing particles of 400 to 600 A average diameter. With higher agglomeration ratios, however, equivalent flow at higher impact is achieved with the most preferred 200 - 400 A reinforcing particles at the higher specified rubber:reinforcing resin weight ratios.

SIZE OF RUBBER PARTICLES

While the size of the rubber particles before agglomeration is not especially critical, there is a difference which must be understood as between the size of the rubber particles produced by the (1) overpolymerization procedure and (2) the rubber particles as may be employed in the coagglomeration technique. In the overpolymerization procedure, the size of the rubber particles will be larger than that of the reinforcing particles because of growth during the overpolymerization whereas the rubber particles employed in the coagglomeration technique can be nearly any convenient size below about 1000 A, more preferably between about an average diameter of 150 and about 800 A. Rubber latex particles larger than about 800 A are uneconomic due to slow rates of polymerization and such larger particles possible will lead to coagulation and/or particles too large in size in the coagglomerated latex.

SIZE OF AGGLOMERATED SUBSTRATE PARTICLES

The size of the agglomerated rubber substrate particles is critical. As indicated, these substrate particles onto which SAN resin is to be grafted must be relatively large in order for the ABS to have good melt flow. The melt flow properties of ABS containing rubber:resin substrate particles of this invention averaging between about 750 and about 1000 A appear to be as good or better than prior art ABS formulations. However, ABS formulations containing rubber:resin substrate particles of this invention averaging between about 1,000 and about 3000 A, more preferably between about 1,000 and 2,000 A, exhibit considerably better and more reliably high melt flow than the prior art ABS products and, more importantly, will evidence better flow simultaneously with high impact at lower rubber levels (15%/wt. or lower) than prior art ABS plastics.

SAN — MOLECULAR WEIGHT

SAN resins employed in the production of ABS plastics may vary somewhat in molecular weight. The molecular weight of SAN may be expressed by any of several solution viscosity values, all determined at 25°C on a solution of about 1 gram of the resin in 100 ml of acetone employing an Oswald type capillary viscosimeter. The point viscosities at the standard resin concentration are known as "dilute solution viscosities" (abbreviated "DSV") and the value obtained by extrapolating the DSV values obtained over a range of resin concentrations to zero resin concentration is known as a limiting viscosity or "intrinsic viscosity" (abbreviated "IV") expressed as deciliters/gram. SAN resins employed in the production of ABS plastics usually vary in IV from about 0.3 to 0.7 and similar resins are operative in the present invention. The overpolymerized SAN resins in the products of this invention are evaluated by extracting the toughener masterbatch with acetone at 25°C and then determining the DVS or IV of the soluble extract.

FINAL STAGE SAN GRAFT POLYMERIZATION

San Monomers Polymerized

In this stage, there is utilized a SAN monomeric mixture of from about 40% to about 80%/wt. of a monovinyl aromatic monomer (as is defined above) such as styrene and from about 60% to about 20%/wt. of an acrylic nitrile, more preferably between about 60% and 75%/wt. of styrene and 40% to 25%/wt. of the acrylic nitrile. The acrylic nitrile may be acrylonitrile itself which is preferred or alphamethyl or alphaethyl substituted acrylonitriles such as methacrylonitrile and ethacrylonitrile. In some cases, although not preferred, small amounts of still other monovinylidene monomers as are defined above, such as methyl methacrylate, may be employed, although these should be kept below about 20%/wt. of the total mixture. Preferred SAN monomers consist of styrene and acrylonitrile in the above indicated preferred proportions.

PROCEDURE

The agglomerated substrate latex is combined in this step with water, the SAN monomers, if necessary additional soap and/or additional water soluble free radical catalyst, preferably a redox catalyst, and other polymerization adjuvents, such as buffers, chelators, etc., the proportions of these materials being selected to favor the formation of a light-colored SAN resin on the latex particles rather than to initiate new resin particles, the principles of U.S. Pat. No. 2,520,959 also being applicable here. The polymerization is effected in a closed vessel at any temperature from about 30° to about 85°C, more preferably between about 50° and about 80°C. The polymerization preferably is continued until essentially all of the monomeric material is polymerized. In cases where a lower conversion is achieved, the unreacted monomeric materials should be removed, preferably by steam distillation under vacuum. During a polymerization reaction carried out at the higher end of the temperature range specified, it may be desirable to add additional proportions of catalyst during the course of the reaction in order to insure high conversion. Likewise, it may be desirable to charge only a portion of the monomers at the start of the reaction and add the remainder incrementally or continuously during the reaction. If the product latex needs be stripped of unreacted monomers, it is usually desirable to heat the latex to about 90°C to destroy the catalyst and then add additional dispersant and/or an antifoam agent to insure latex stability in the monomer stripping step. As a last step before coagulation and recovery of the graft product, the latex should be filtered to remove nondispersed solids.

GRAFT RATIO

The ABS toughener masterbatch sometimes is also evaluated to determine the "graft ratio" (abbreviated "G") which is the weight ratio of acetone-insoluble SAN content to the original total weight of rubber (acetone-insoluble) in the toughener sample. This value varies somewhat widely from about 0.2 to 1.0 or more presumably depending on the proportion of SAN actually affixed by primary valence bond type of grafting to the butadiene rubber. In the toughener products of this invention, the crosslinked reinforcing resin is insoluble in acetone. One should deduct the weight of insoluble, crosslinked reinforcing copolymer resin to arrive at the ratio of overpolymerized SAN which is grafted. However, the G values reported herein include the reinforcing resin, unless otherwise stated.

FINAL WORKUP

The final latex product is then coagulated by addition of salt/acid, alum, calcium chloride, or any other coagulation agent thereby producing a slurry in water of macrogranular particles of resin which can be worked up by filtering, washing, and drying, preferably in a vacuum oven at temperatures below about 100°C.

This latter dried product is the toughener masterbatch which may be blended with additional SAN resin by powder blending the dried resins in an internal mixer but is much more efficiently carried out in the polymer plant by blending the aqueous slurry of coagulated masterbatch product with a similar aqueous slurry of a SAN resin not containing rubber and then working up the resulting blended slurry as described. Made in either way, the blended resin formulation requires mastication under shear at temperatures between about 275° to about 400°F, more preferably 290° to 350°F, to be fused, fluxed and homogenized in which form it will exhibit high impact strength, and good melt flow properties.

ABS PLASTIC POLYMERIC COMPOSITION

The final ABS plastic formulations of this invention may contain from as little as about 5%/wt. of rubber to as much as about 25%/wt., all based on total polymeric content. It is generally preferred to employ a minimum of rubber consistent with the desired impact resistance in the product. Since the novel ABS toughener is so much more efficient and produces equivalent or better impact at lower rubber levels than in prior art ABS, it is preferred that the ABS formulations of this invention contain sufficient of the improved toughener masterbatch as to constitute between about 10% and about 18%/wt. of rubber based on total polymeric content. For increased resistance to environmental degradation, it is preferred in many instances for the ABS formulations of this invention to contain sufficient of the improved toughener masterbatch to constitute only between about 10% and about 15%/wt. of rubber.

OTHER COMPOUNDING INGREDIENTS

As is normal for ABS plastics, the ABS plastics of this invention will usually be compounded with the usual proportions of colorants, pigments, stabilizers, antioxidants, antistatic agents, and other conventional ABS compounding ingredients.

OTHER TEST PROCEDURES

In this description, samples of the experimental and control compositions are prepared by a standardized procedure and the resulting compositions converted to standard ASTM tensile sheets by press molding to provide samples for physical evaluation.

The blended powdery product is milled together with compounding ingredients on a standard two-roll differential laboratory plastics mill having 4-inch oil-heated rolls maintained at about 310°F and rotating at 15/20 rpm. The stock is milled for 4 minutes after sheet formation on the back roll with the stock repeatedly cut back and forth on the rolls to insure homogeneity and complete fluxing.

Izod impact values reported herein are as determined by ASTM D-256-56. Tensile, elongation and other physical properties likewise are determined according to ASTM Procedures standard for ABS plastics.

MELT FLOW INDEX

This test is performed according to ASTMD 1238-70 at 225°C employing a load of 8,640 grams. This procedure employs a constant load rheometer wherein a sample of resin is placed in a cylinder heated to the specified temperature under a piston exerting the specified load and the weight of resin which flows through an orifice in 10 minutes is taken as the "melt flow index" or "melt index".

There follows a number of specific examples which are intended as illustrative only and not as limiting in any way.

EXAMPLE I

PREPARATION OF REINFORCING RESIN LATEX

A mixture of styrene and divinyl benzene are polymerized at 10°C employing the following materials:

| RECIPE | PARTS/WT. |
| --- | --- |
| Potassium Oleate | 5 |
| K$_2$HPO$_4$ (Buffer) | 0.2 |
| Ferrous disodium salt of ethylene diamine tetraacetic acid (chelator) | 0.001 |
| Sodium formaldehyde sulfoxylate ) ) Redox | 0.15 |
| Diisopropyl benzene hydroperoxide ) Catalyst | 0.17 |
| Styrene | 10 |
| Divinyl benzene | 0.15 |
| Water | 180.0 |

The reaction vessel and its contents are tumbled end-over-end in a 10°C constant temperature bath for several hours. At this point the vessel is removed from the water bath. About 99% of the monomers is found to have polymerized due to the vigor of the redox-style polymerization system and the high soap content producing a latex having a particle size of about 150 A in average diameter.

FIRST-STAGE OVERPOLYMERIZATION 0.2 parts/wt. of an alkyl mercaptan and 100 parts/wt. of liquid monomeric butadiene-1,3 is then added by injection and the vessel returned to the water bath for another several hours, also at 10°C. No added soap or catalyst is necessary in this experiment. At the end of the reaction about 70% of the butadiene-1,3 has polymerized producing a latex of the polymeric product. The unreacted butadiene is stripped off and a sample of the latex product submitted to a standard soap titration procedure. The calculated average diameter of the rubber-coated styrene/divinyl benzene copolymer seed resin particles is about 350 A. In such product, the rubber:resin weight ratio is about 7:1.

FREEZE AGGLOMERATION

The rubber-on-resin overpolymerized first stage latex is then freeze-agglomerated at −20 to −25°C employing a frozen hold-up time of about 5 minutes. After thawing, a sample of the thawed latex is again subjected to a soap titration and the diameter of the agglomerated rubber-coated latex particles is found to average (number average) between about 1000 and 1100 A.

SAN GRAFT OVERPOLYMERIZATION

This step is conducted employing the following materials:

| RECIPE | Parts/wt. |
| --- | --- |
| Above agglomerated latex sufficient to contain | 50 gms polybutadiene 7 gms styrene copolymer particles |
| Water | 150 |
| Dextrose | 0.55 |
| Diisopropyl benzene hydroperoxide | 0.30 |
| Acrylonitrile | 15.8 |
| Styrene | 34.2 |
| Alkyl Mercaptan Modifier | 0.26 |

The mercaptan is dissolved in the premixed monomers and the resulting mixed solution is pumped into the polymerization vessel at a uniform rate about equal to the rate of polymerization and while maintaining the reaction mixture at about 60°C.

At the end of the reaction, it is found that over 95% of the monomers have polymerized forming a latex product. There is then added 5 parts/wt. of a nonstaining rubber antioxidant (in the form of an aqueous emulsion) for every 100 parts/wt. of monomeric butadiene polymerized in the product. The resulting mixed emulsion is stirred to homogeneity and then a solution of calcium chloride coagulant is added to precipitate the latex solids. The resulting granular slurry is filtered, the filter cake washed with water, and the filter cake dried in a vacuum oven at 50°C. Such dry product contains about 45%/wt. of the polybutadiene rubber.

The resulting dry product is then powder blended with a granular form of a rubber-free styrene/acrylonitrile copolymer resin (31%/wt. of combined acrylonitrile; IV about 0.5) to yield powder blends containing, respectively, about 12, 15 and 18 parts/wt. of polybutadiene per 100 parts/wt. of total polymer. Corresponding control compositions are prepared by a similar series of steps and materials but without the styrene/divinyl benzene copolymer reinforcing resin latex. All compositions contain, in addition, 1 part/wt. of stearic acid for every 100 parts/wt. of total polymer. The powder blends are milled for 4 minutes at 310°F. and the resulting mill-mixed sheets converted to standard ASTM tensile sheets by compression molding for 5 minutes at 350°F in a standard ASTM tensile sheet mold.

Replicate standard ⅛-inch Izod bars are cut from the tensile sheets and the Izod impact strength of each determined. The tensile strength at yield of each sample is also determined. The results are as follows:

precursor latices are freeze agglomerated as described in the previous example with varying degrees of success as witness the declining particle size vs increasing reinforcing resin content in the agglomerated substrate latices. The graft polymerization with SAN (Ca 31%/wt. acrylonitrile; IV Ca 0.5) is carried out so as to produce products containing nearly equal proportions of rubber (less reinforcing resin) and SAN (less reinforcing resin).

The dried, coagulated products are powder blended with rubber-free SAN resin (IV Ca 0.5) so as to contain, respectively, 10, 12 or 15 %/wt. of rubber based on total polymer content. The properties of the resulting ABS plastic formulations are as follows:

| Styrene Resin Size A | Rubber coated Particles A | Agglom. Particles A | Rubber Resin Wt. Ratio | ABS PLASTICS | | |
|---|---|---|---|---|---|---|
| | | | | Rubber* Content | Izod ft/lbs/in | Melt Index |
| 167 | 390 | 1020 | Ca10:1 | 15 | 6.3 | 3.9 |
| 167 | 390 | 1020 | Ca10:1 | 12 | 4.3 | 8.8 |
| 167 | 390 | 1020 | Ca10:1 | 10 | 2.1 | 14.1 |
| 167 | 320 | 760 | 5:1 | 15 | 5.4 | 0.6 |
| 167 | 320 | 760 | 5:1 | 12 | 3.2 | 6.0 |
| 167 | 320 | 760 | 5:1 | 10 | 1.8 | 9.6 |
| 167 | 280 | 580 | 3.33:1 | 15 | 4.7 | 0.3 |
| 167 | 280 | 580 | 3.33:1 | 12 | 2.5 | 2.6 |
| 167 | 280 | 580 | 3.33:1 | 10 | 1.6 | 6.4 |
| 167 | 260 | 485 | 2.5:1 | 15 | 3.6 | 0.2 |
| 167 | 260 | 485 | 2.5:1 | 12 | 2.6 | 0.6 |
| 167 | 260 | 485 | 2.5:1 | 10 | 1.9 | 4.1 |

* %/wt. rubber based on total weight of polymer

The above data clearly show the adverse effects of too much reinforcing resin (i.e. low rubber:resin ratio).

| | Experimental ABS With Reinforcing Resin | | | ABS Control-No Reinforcing | | |
|---|---|---|---|---|---|---|
| %/wt. polybutadiene* | 12 | 15 | 18 | 12 | 15 | 18 |
| Izod (20°C) (av.) | 5–6 | 10–11 | 12–13 | 2–3 | 4–5 | 5–6 |
| Tensile at yield point-psi(av.) | 5500 | 4700 | 4300 | 6200 | 5600 | 5000 |

*%/wt. of rubber based on total weight of polymer

These data indicate quite clearly a very large and significant increase in the efficiency of the rubber phase in the experimental composition due to the use of the reinforcing resin particles. Note that at 18%/wt. of rubber, the experimental composition shows more than twice the Izod value of the control at the same rubber content. Note also that the experimental composition at 12%/wt. of rubber has an Izod value as high as that of the standard ABS control composition at 18%/wt. of rubber. This is a one-third decrease in the rubber content (or a 50% decrease based on the experimental level) required for high impact. Further reduction of the rubber to 5 to 10 parts/wt. per 100 parts/wt. of total polymer is possible when producing low-to-medium impact ABS plastics.

EXAMPLE II

The procedure of the preceding example employed somewhat too high a proportion of rubber to best demonstrate the invention. The procedures are repeated employing as a starting material a crosslinked styrene/divinyl benzene copolymer (1.5 parts/wt. divinyl benzene/100 of styrene) resin latex containing particles averaging 167 A in diameter. The first stage rubber-on-resin overpolymerization is conducted at weight ratios, respectively, of 10:1, 5:1, 3.33:1, and 2.5:1 and with conversions from 92 to 98%. The resulting substrate As the proportion of the resin increases, the average size of the agglomerated rubber particles decreases, probably due to too much soap, and concomitantly the melt flow properties of the ABS plastic formulation are seriously reduced. Note also, the Izod impact also is less below a rubber-reinforcing resin weight ratio of 5:1. The above data also demonstrates that the agglomerated rubber: resin particles should be larger than about 750 A with much better results when the agglomerated particles are larger than about 1000 A.

As a result of the above experiments, it is decided to prepare another series of products based on somewhat smaller proportions of reinforcing resin and somewhat larger reinforcing resin particles.

The reinforcing resin latex is produced employing a recipe similar to that of Example 1 except that the proportion of potassium oleate is reduced and 2.50 parts/wt. of allyl methacrylate are substituted for the divinyl benzene. A latex is produced the particles of which average 195 A in diameter. An additional proportion of styrene containing 2.5 parts/wt. of allyl methacrylate per 100 parts/wt. of styrene are added and the polymerization recommenced to further enlarge the particles. The final latex of crosslinked styrene/allyl methacrylate copolymer contains particles averaging 447 A in diameter. Butadiene-1,3 containing 0.2 parts/wt. of an alkyl mercaptan per 100 parts by weight of butadiene are added and polymerization again resumed for several hours until about 82.3% of the butadiene has polymerized. At this point, the latex particles average about 990 A. The latter latex is freeze-agglomerated as described in Example 1 to produce an agglomerated latex in which the latex particles average about 1,430 A (agglomeration ratio 1.45). The resulting substrate solids contains about 9.86 parts/wt. of reinforcing resin per 100 parts/wt. of polybutadiene rubber on a dry basis. SAN is then graft-polymerized onto the substrate latex particles in a manner similar to that of the preceding examples to produce a latex product containing on a dry solids basis 50 parts/wt. of rubber, 5.98 parts/wt. of reinforcing resin, and about 45.2 parts/wt. of SAN graft copolymer resin. (SAN IV ca 0.5; ca 31% acrylonitrile; graft ratio 0.62). The dry solids produced by coagulation and drying of the latter latex product is powder blended with SAN (IV ca 0.5) to produce final compositions containing 15, 12 and 10%/wt. ("PHR") of rubber based on total polymer content. The Izod and melt flow characteristics of the resulting ABS plastic formulation are as follows:

| Rubber PHR | Izod ft.lbs./in. | Melt Index | Yield Tensile lbs/sq.in. |
|---|---|---|---|
| 15 | 7.3 | 13.4 | 5550 |
| 12 | 3.7 | 19.2 | 6210 |
| 10 | 1.5 | 24.7 | 6750 |

Note the relatively high melt index values for the compositions containing the 15 and 12 parts/wt. of rubber. These compositions, and particularly the 15 part composition, combine high impact and relatively high melt index value showing the desirability of employing rubber particles larger than about 1000 A in average diameter. The composition containing 10 parts/wt. of rubber is a moderate impact, high melt flow composition which is very easy to process. It is not known whether grafting occurred between the rubber and the styrene/allyl methacrylate copolymer reinforcing resin in any of these products but this experiment and others indicate such grafting may occur and be advantageous.

The procedure of Example Ii is repeated preparing a reinforcing resin latex employing a mixture of styrene and 1.5 parts/wt. of divinyl benzene per 100 parts/wt. of styrene. The resulting polymerization is first carried out to produce a resin latex containing particles averaging 330 A in diameter. A portion of the latter resin latex is employed in the preparation of a product by overpolymerizing butadiene, agglomerating and SAN grafting. The remainder of the same latex is employed in a second polymerization with the same mixture of styrene/divinyl benzene wherein the latex particles are enlarged until they average about 600 A in diameter. The latter larger particle latex is also used in the preparation of another similar product by butadiene overpolymerization, agglomeration and SAN grafting.

The table below lists the reinforcing resin size, the size of the rubber-coated particles, the size of the agglomerated rubbery substrate particles, the resin/rubber proportions and the Izod impact and melt index properties of the two products.

| Rubber Content Formulation (1) | Reinforcing Resin Size A | Rubber-Coated Particles A | Rubber: Resin Ratio 1st Stage | Agglom Substrate Particle-Size A | ABS Plastic Composition - Parts/wt. | | | IZOD ft.lbs/in. | Melt Index |
|---|---|---|---|---|---|---|---|---|---|
| | | | | | Reinforcing Resin | Rubber | SAN | | |
| 15 | 330 | 670 | 10:1 | 1370 | 7.97 | 50 | 44 | 8.0 | 10.8 |
| 12 | 330 | 670 | 10:1 | 1370 | 7.97 | 50 | 44 | 3.6 | 17.4 |
| 10 | 330 | 670 | 10:1 | 1370 | 7.97 | 50 | 44 | 1.7 | 22.1 |
| 15 | 600 | 1360 | 10:1 | 1800 | 7.56 | 50 | 47 | 3.0 | 14.3 |
| 12 | 600 | 1360 | 10:1 | 1800 | 7.56 | 50 | 47 | 2.3 | 20.8 |
| 10 | 600 | 1360 | 10:1 | 1800 | 7.56 | 50 | 47 | 1.6 | 25.7 |

(1) %/wt. based on total polymer

Note that the above formulations differ only in the size of the reinforcing resin, the size of the rubber overpolymerized particles and of the agglomerated substrate particles. The plastic formulations containing the larger rubber-containing particles possess lower impact at the same rubber levels but the melt index values are somewhat better, especially at the 10 and 12 part rubber loadings. When the agglomeration step is omitted and the SAN graft polymerization conducted directly on directly grown 1360 A particles of a similar first stage, rubber-on-resin product but with otherwise similar procedure and proportions, ABS plastic is produced having the following properties.

| Rubber PHR | Izod ft.lbs/in. | Melt Index | Yield Tensile lbs/sq.in. |
|---|---|---|---|
| 15 | 1.1 | 8.2 | 5900 |
| 12 | 1.2 | 16.2 | 6300 |
| 10 | 0.3 | 19.7 | 6780 |

The drastically lower impact strength indicates either (1) that coverage of the rubber on the reinforcing resin particles is better with agglomeration than without or (2) that it is important to produce rubber particles containing many resin particles rather than just one resin particle. Note also that the Melt Index values are somewhat poorer than those of the comparable products produced by agglomeration.

EXAMPLE IV

In this example, the rubber-on-resin overpolymerization step is replaced with the alternative coagglomeration procedure wherein a latex of reinforcing resin and a latex of polybutadiene rubber are blended, styrene monomer to the extent of about 50%/wt. based on the weight of styrene copolymer is added as a solvent or swelling agent for the rubber to improve agglomeration, and the blended latex is subjected to freeze agglomeration as described above. The reinforcing resin particles are prepared from a mixture of 100 parts/wt. of styrene and 1.5 parts/wt. of divinyl benzene. The resulting reinforcing resin particles average about 193 A in diameter. Other similar resin latices are produced containing particles, respectively of 447 A and 600 A in average diameter. The polybutadiene rubber latex also is made by conventional polymerization in aqueous emulsion employing potassium oleate soap and about 0.2 parts/wt. of an alkyl mercaptan modifier for every 100 parts/wt. of butadiene-1,3 charged. The resulting rubber latex contains about 40%/wt. of total solids and latex particles averaging about 255 A in diameter. The latter latex is blended with each of the resin latices and with styrene monomer amounting to half the weight of styrene resin and the resulting latex mixture coagglomerated by freezing as described above. The results of the freeze-agglomeration are as follows:

| Experiment No. | Reinforcing Resin A | Rubber/Resin Wt. Ratio | Agglomerated Latex Particle Size A |
|---|---|---|---|
| 863 | 195 | 6.6:1 | 915 |
| 862 | 193 | 5:1 | 790 |
| 865 | 447 | 6.6:1 | 1200 |
| 864 | 600 | 6.6:1 | 2220 |

The coagglomerated rubber substrate latices described above are then overpolymerized with SAN (ca 31% acrylonitrile; IV ca 0.5) in aqueous dispersion in the manner described to yield toughener masterbatches containing the proportions of reinforcing resin/rubber/SAN specified below. The styrene monomer remaining in the latex after coagglomeration is taken into consideration as a portion of the SAN monomers charged in the SAN polymerization step. The dried masterbatches are blended by mastication with rubber-free SAN (IV Ca 0.5) to produce ABS plastics having the following properties:

TOUGHENER PROPORTIONS — PARTS/WT.

| Substrate No. | Resin | Rubber | SAN | G | Rubber | IZOD | Melt Index | Yield Tensile |
|---|---|---|---|---|---|---|---|---|
| 863 | 7.5 | 50 | 53 | 0.71 | 15 | 7.41 | 3.2 | 5780 |
| | | | | | 12 | 4.79 | 10.7 | 6200 |
| | | | | | 10 | 3.06 | 16.6 | 6530 |
| 862 | 10 | 50 | 49 | 0.82 | 15 | 5.52 | 0.2 | 5470 |
| | | | | | 12 | 3.94 | 3.0 | 6150 |
| | | | | | 10 | 1.16 | 8.1 | 6460 |
| 864 | 7.5 | 50 | 48 | — | 15 | 6.42 | 13.4 | 4910 |
| | | | | | 12 | 2.88 | 18.5 | 5370 |
| | | | | | 10 | 1.64 | 24.2 | 5760 |
| 865 | 7.5 | 50 | 48 | 0.72 | 15 | 5.69 | 9.0 | 5510 |
| | | | | | 12 | 2.40 | 15.3 | 5970 |
| | | | | | 10 | 1.52 | 20.1 | 6340 |

It is clear that all of the above formulations have rather good impact at the 12 and 15 part rubber levels. The product containing substrate 863 at the 10 PHR level of rubber is a high impact, high flow product. Experiments 864 and 865 demonstrate quite good impact combined with high melt index, again demonstrating the value of large rubber substrate particles in respect of melt flow properties. It is clear that the coagglomeration technique is excellent when working with 200 – 600 A reinforcing resins.

EXAMPLE V

In this example, resin-reinforced toughener masterbatches are prepared from (1) a small (248 A) particle size 100 styrene/1.5 divinyl benzene copolymer latex (experiment 831) and (2) a medium particle size (447 A) 100 styrene 2.5 allyl methacrylate copolymer latex (experiment 852). The masterbatches are prepared by the rubber overpolymerization, agglomeration and SAN overpolymerization procedures. The toughener compositions have about the same resin/rubber/SAN proportions as in the preceding examples. The SAN contain about 31%/wt. of acrylonitrile. The properties of ABS plastic formulations made therefrom are as follows:

| Exp. No. | Resin A | Rubber Latex A | Agglomeration A | Rubber Content | IZOD lbs/in. | Melt Index | Yield Tensile lbs/in.$^2$ |
|---|---|---|---|---|---|---|---|
| 831 | 248 | 544 | 960 | 15 | 8.2 | 0.39 | 4890 |
| | | | | 12 | 8.1 | 3.2 | 5580 |
| | | | | 10 | 3.5 | 6.9 | 6110 |
| 852 | 447 | 990 | 1430 | 15 | 7.3 | 13.4 | 5550 |
| | | | | 12 | 3.7 | 19.2 | 6210 |
| | | | | 10 | 1.5 | 24.7 | 6750 |
| 833 | 447 | 990 | 990* | 15 | .48 | 3.87 | 6110 |
| | | | | 12 | .33 | 10.7 | 6490 |
| | | | | 10 | .27 | 16.0 | 7080 |

*Not agglomerated

The above data again demonstrate the value of substrate particles larger than 1000 A when good melt flow is desired. However, the Izod impact values of the first two sets of formulations are extraordinary at such modest rubber contents. The last set of formulations in experiment 833 made with a substrate which was not agglomerated, although containing particles (990 A) substantially the same as in experiment 831, fails to develop either impact resistance or really good melt flow properties. When experiment numbers 831 and 852 are compared, there is seen what may be another instance where possible grafting between the rubber and the reinforcing resin (employing allyl methacrylate crosslinker) may have exerted a beneficial effect, this time on the melt index and yield tensile values.

EXAMPLE VI

In this example, the details of a difficult direct growth experiment is reported. A reinforcing resin latex is prepared from a mixture of 100 parts/wt. of styrene and 3 parts/wt. of diethylene glycol diacrylate, such latex containing particles averaging 990 A.

Polybutadiene is overpolymerized on this large particle latex to produce a latex containing rubber-coated resin particles averaging about 1500 A in diameter, such overpolymerization requiring 7 days at 50°C to convert about 74% of the butadiene to rubber. Because of the already large size of the rubber particles, agglomeration is omitted and SAN resin is overpolymerized on the rubber-coated latex particles in aqueous dispersion by procedures already described so as to produce a product containing about 60 parts/wt. of rubber, 25.9 parts/wt. of reinforcing resin and 44.5 parts/wt. of SAN (ca. 31% acrylonitrile; IV ca. 0.5). The latter product is then diluted with SAN (IV ca. 0.5) to produce ABS plastics containing 12, 16 and 20 parts/wt. of rubber for every 100 parts/wt. of total resin. The properties of these plastics are as follows:

| Rubber Parts/Wt. | Izod lbs/in | Melt Index | Yield Tensile lbs/sq.in |
| --- | --- | --- | --- |
| 12 | 0.46 | 7.0 | 6600 |
| 16 | 0.78 | 2.1 | 5880 |
| 20 | 0.88 | 0.2 | 5320 |

This experiment again demonstrates that useful products are produced when the rubber particles contain many small resin particles rather than a single large resin particle.

EXAMPLE VII

In this example, the concentration of the crosslinking monomer, divinyl benzene, is varied to determine the effect of such variation on the properties of the ABS. Two styrene/divinyl benzene copolymer latices are prepared, one made from a mixture of 100 parts/wt. of styrene and 1.5 parts/wt. of divinyl benzene and the other from a mixture of 100 parts/wt. of styrene and 3 parts/wt. of divinyl benzene. Each of such latices contain particles averaging about 200 A. In the butadiene overpolymerization step, the latex particles are increased to about 400 A by the use of 100 parts/wt. of butadiene-1,3 and 10 parts dry weight of the original styrene copolymer resin, about 70%/wt. of the butadiene being polymerized. Both latices are freeze-agglomerated producing agglomerated latices containing particles of about 1060 A in average diameter. Sufficient of each of the agglomerated latices constituting 50 parts dry weight of rubber and 7.42 parts/wt. of reinforcing resin are combined with 50 parts/wt. of SAN monomers (styrene 68.5% and acrylonitrile 31.5%/wt.) and the SAN polymerized to produce about 47 parts/wt. of graft-polymerized SAN resin on 50 parts/wt of rubber. ABS plastics produced by mixing each toughener masterbatch with additional SAN resin (IV ca. 0.5) have the following properties:

| Divinyl Benzene Content % Based on Styrene | Rubber Content Parts/wt. | IZOD | Melt Index |
| --- | --- | --- | --- |
| 1.5 | 12 | 6.2 | 5.6 |
|  | 15 | 10.6 | 1.6 |
|  | 18 | 12.6 | 0.2 |
| 3.0 | 12 | 3.5 | 5.3 |
|  | 15 | 5.9 | 0.9 |
|  | 18 | 8.1 | 0.4 |

The higher crosslinking level of 3% divinyl benzene appears to reduce both impact resistance and melt index. Thus, only 1 – 2%/wt. of crosslinking monomer based on the styrene monomer is preferred.

EXAMPLE VIII

In this example, a proportion of SAN resin double that of the previous examples is overpolymerized on a resinreinforced, agglomerated substrate of this invention. The reinforcing resin latex is a 100 styrene/1.5 divinyl benzene copolymer latex containing particles averaging 193 A in diameter. The latter is subjected to overpolymerization with butadiene whereby 50 parts/wt. of polybutadiene are deposited on 10 parts dry weight of the copolymer resin particles to produce a latex containing particles averaging 443 A in diameter. After freeze agglomeration, a substrate latex containing particles averaging 1390 A is produced. The SAN-on-rubber substrate product contains 100 parts/wt. of SAN (ca 31%/wt. of acrylonitrile; IV ca 0.5), 50 parts/wt. of rubber and about 5.33 parts/wt. of reinforcing resin and the toughener masterbatch product shows a graft ratio (G) of 1.12. ABS plastics made from the toughener at 12 and 10 parts/wt. of rubber exhibit the properties listed below compared to a similar product produced at a G of 0.62 (50 rubber; 50 SAN; 5.3 Reinforcing Resin);

| Toughener SAN Content* | Rubber Content | IZOD | Melt Index |
| --- | --- | --- | --- |
| 100 | 12 | 4.2 | 15.5 |
| 100 | 10 | 1.9 | 19.5 |
| 50 | 12 | 3.5 | 17.9 |
| 50 | 10 | 1.5 | 23.3 |

* 193 A Reinforcing Resin, all.

The higher SAN overcoat and higher graft ratio seemed to favor higher impact and lower melt index. However, the differences are small and both products possess a good balance of impact and melt index.

I claim:

1. In a method of preparing an ABS toughener by graft overpolymerizing SAN monomers onto the latex particles of a butadiene-1,3 synthetic rubber, the improvement which comprises (1) associating said synthetic rubber latex particles with latex particles of a hard, crosslinked copolymer resin produced by polymerizing a monomeric mixture comprising at least 60%/wt. of a vinyl aromatic hydrocarbon, not more than about 39.5%/wt. of one or more monovinylidene monomers copolymerizable with said monovinyl aromatic hydrocarbon in aqueous dispersion, and from about 0.5% to about 4%/wt. of a crosslinking monomer copolymerizable with said monovinyl aromatic hydrocarbon in aqueous dispersion and containing at least two nonconjugated monovinylidene $CH_2=C<$ groups per molecule, said particles of hard, crosslinked copolymer averaging between about 150 and about 800 A in diameter and the weight ratio rubber:copolymer resin in the resulting latex product being between about 15:1 to about 8:1, (2) agglomerating the said step (1) rubber:copolymer resin latex to produce a latex containing enlarged particles averaging between about 1000 and 3000 A in diameter; (3) adding SAN monomers to the resulting agglomerated step (2) latex and (4) effecting graft overpolymerization in the resulting aqueous dispersion of SAN resin on the agglomerated rubber:resin particles to produce a final polymerization product containing between about 40 and about 200 parts/wt. SAN resin for every 100 parts/wt. of said rubber calculated as rubber less said copolymer resin.

2. In a method of preparing a toughener masterbatch for ABS plastics by graft over-polymerizing an SAN resin onto latex particles of a butadiene-1,3 synthetic rubber, the improvement which comprises (1) preparing a latex of a hard, crosslinked copolymer by polymerizing in aqueous emulsion a monomeric mixture consisting of at least about 60%/wt. of a monovinyl aromatic hydrocarbon monomer, not more than about 39.5%/wt. of one or more monovinylidene monomers copolymerizable in aqueous emulsion with said monovinyl aromatic hydrocarbon monomer, and from about 0.5% to about 3%/wt. of a nonconjugated crosslinking monomer containing at least two $CH_2=C<$ groups per molecule, thereby to produce a latex containing said hard, crosslinked copolymer in the form of latex particles averaging between about 200 and about 600 A in diameter, (2) mixing the step (1) latex with a synthetic rubber monomeric material consisting of not less than 70%/wt. of butadiene-1,3 and not more than a total of 30%/wt. of one or more monovinylidene monomers copolymerizable with butadiene-1,3 in aqueous emulsion to form rubbery copolymers and a gel inhibiting modifier, (3) effecting over-polymerization of said synthetic rubber monomeric material in the mixture of step (2) to a conversion of from about 60% to about 85% to deposit synthetic rubber on said particles of hard, crosslinked copolymer in a weight ratio rubber to resin of from about 5:1 to about 20:1, (4) combining with the resulting step (3) latex from about 20% to about 100%/wt. of monomeric styrene based on the weight of said hard, crosslinked copolymer in the resulting latex/styrene mixture and agglomerating the resulting latex/styrene mixture to produce an agglomerated latex in which the latex particles contain said hard, crosslinked copolymer, said synthetic rubber and said monomeric styrene and average between about 1000 and about 2000 A in diameter, and (5) mixing the resulting step (4) agglomerated latex with an SAN resin monomeric mixture consisting of from about 40% to about 80%/wt. of styrene, from about 60% to about 20%/wt. of acrylonitrile, and not more than about 20%/wt. of one or more other monovinylidene monomers and effecting graft-over-polymerization of said SAN resin monomeric mixture in the resulting reaction mixture to deposit on said agglomerated latex particles from about 50 to about 500 parts/wt. of SAN resin per 100 parts/wt. of said synthetic rubber in the said agglomerated latex particles.

3. The method as defined in claim 2 and further characterized by said hard, crosslinked copolymer of step (1) being a copolymer produced from a monomeric mixture consisting of styrene and said crosslinking monomer and prepared as latex particles averaging between about 200 and about 400 A in diameter, by said synthetic rubber monomeric material of step (3) being polybutadiene-1,3 of Mooney viscosity between about 70 and about 100 ML at 212°F. and there being in the product of step (3) a weight ratio polybutadiene:hard copolymer between about 8:1 and about 15:1, by the agglomeration of step (4) being carried out by freezing said latex/styrene mixture at a temperature between about −10° and about −30°C., and said SAN resin of step (5) being deposited from a monomeric mixture consisting of from about 60% to about 75%/wt. of styrene and from about 40% to about 25%/wt. of acrylonitrile.

4. The method as defined in claim 2 and further characterized by said hard, crosslinked copolymer of step (1) being a copolymer produced from a monomeric mixture consisting of styrene and a said crosslinking monomer selected from the class consisting of the vinyl and allyl alcohol monoesters of alpha-beta unsaturated monocarboxylic acids and prepared as latex particles averaging between about 200 and about 400 A in diameter, by said synthetic rubber of steps (2) and (3) being polybutadiene-1,3 and there being in the product of step (3) a weight ratio polybutadiene-1,3:hard copolymer between about 8:1 and about 15:1, by the agglomeration of step (4) being carried out by freezing said latex/styrene mixture at a temperature between about −10° and about −30°C., and said SAN resin of step (5) being a copolymer deposited from a monomeric mixture consisting of from about 60% to about 75%/wt. of styrene and from about 40% to about 25%/wt. of acrylonitrile.

5. The method as defined in claim 2 and further characterized by said hard, crosslinked copolymer of step (1) being a copolymer produced from a monomeric mixture consisting of styrene and from about 1% to about 2%/wt. of divinyl benzene and prepared as latex particles averaging between about 200 and about 400 A in diameter, by said synthetic rubber of step (3) being polybutadiene-1,3 having a Mooney viscosity between about 70 and about 100 ML at 212° F. and present in the product of step (3) in the weight ratio polybutadiene:resin between about 8:1 and about 15:1, and by said SAN resin of step (5) being deposited from a monomeric mixture consisting of from about 60% to about 75%/wt. of styrene and from about 40% to about 25%/wt. of acrylonitrile.

6. The method as defined in claim 2 and further characterized by said hard, crosslinked copolymer of step (1) being a copolymer produced from monomeric mixture consisting of styrene and from about 1% to about 4%/wt. of allyl methacrylate and prepared as latex particles averaging between about 200 and about 600 A in diameter, by said synthetic rubber of step (3) being polybutadiene -1,3 having a Mooney viscosity between about 70 and about 100 ML at 212°F. and present in the product of step (3) in the weight ratio polybutadiene:resin between about 8:1 and about 15:1, and by said SAN resin of step (5) being deposited from a monomeric mixture consisting of from about 20% to about 75%/wt. of styrene and from about 40% to about 25%/wt. of acrylonitrile.

7. An improved toughener for ABS plastics comprising a continuous matrix of styrene/acrylonitrile copolymer resin containing from about 40 to about 200 parts/wt. of graft polymerized styrene/acrylonitrile copolymer resin for every 100 parts/wt. of a discontinuous particulate phase consisting of polybutadiene rubber exhibiting a Mooney viscosity between about 70 and about 100 ML at 212°F. present in said matrix as tough, rubbery, low-gel particles averaging between about 1,000 and about 2,000 A in diameter and said particles containing therein a plurality of dispersed small, hard and crosslinked copolymer resin particles averaging between about 200 and about 400 A in diameter, the weight ratio polybutadiene:resin in said disperse phase being between about 8:1 to about 15:1, the said hard, crosslinked copolymer particles being a copolymer produced by the polymerization in aqueous dispersion of a monomeric mixture consisting of at least 60%/wt. of a monovinyl aromatic hydrocarbon monomer, not more than 39.5%/wt. of one or more monovinylidene monomers copolymerizable in aqueous dispersion with the monovinyl hydrocarbon monomer in question, and from about 1%/wt. of a nonconjugated crosslinking monomer containing at least two nonconjugated $CH_2=C<$ groups per molecule and said styrene/acrylonitrile continuous phase comprising a copolymer of from about 60% to about 75%/wt. of styrene, from about 40% to about 25%/wt. of acrylonitrile, and not more than about 20%/wt. of one or more other monovinylidene monomers copolymerizable with styrene and acrylonitrile in aqueous dispersion and said styrene/acrylonitrile resin having a molecular weight as evidenced by an intrinsic viscosity of 0.3 to 0> deciliters/gram as determined on a solution of about 1 gram of acetone extracted resin in 100 ml of acetone at 25°C.

8. In a method of preparing a toughener for ABS plastics by graft overpolymerizing an SAN resin onto latex particles of a butadiene-1,3 synthetic rubber, the improvement which comprises the steps of (1) preparing said particles of synthetic rubber by polymerizing in an aqueous emulsion containing a gel-inhibiting modifier a mixture of monomeric materials consisting of not less than about 70%/wt. of monomeric butadiene-1,3 and not more than about 30%/wt. of one or more monovinylidene monomers which combine with butadiene-1,3 to produce rubbery copolymers, said polymerization being carried to a conversion of 60 to 85% to produce a synthetic rubber latex in which the rubber is low in gel content, has a Mooney viscosity of at least 70 ML at 212°F, and is present as said latex particles averaging between about 150 and about 800 A in diameter, (2) blending the resulting synthetic rubber latex with (a) a reinforcing resin latex containing latex particles averaging between about 200 and about 600 A in diameter and composed of a hard, crosslinked copolymer of a monomeric mixture of at least about 60%/wt. of styrene, not more than about 39.5%/wt. of one or more monovinylidene monomers copolymerizable with styrene in aqueous emulsion, and from about 0.5% to about 3%/wt. of a nonconjugated crosslinking monomer containing at least two nonconjugated $CH_2=C<$ groups per molecule, there being so combined said synthetic rubber and said hard, crosslinked copolymer in a weight ratio, respectively, from about 5:1 to about 20:1, and (b) from about 20% to about 100%/wt. based on the weight of said hard, crosslinked copolymer of monomeric styrene, (3) agglomerating the resulting blended latex/styrene mixture to produce a coagglomerated latex in which the agglomerated latex particles contain said synthetic rubber, said hard, crosslinked copolymer and said monomeric styrene and average between about 1000 and about 2000 A in diameter, (4) adding to said coagglomerated latex a mixture of SAN resin monomeric materials sufficient, when the proportion of said monomeric styrene in the said agglomerated latex particles is allowed for, to consist of from about 40% to about 80%/wt. of styrene, from about 60% to about 20%/wt. of acrylonitrile and not more than about 20%/wt. of one or more monovinylidene monomers other than styrene and acrylonitrile and (5) graft over-polymerizing the said SAN resin monomeric materials on the said coagglomerated particles to deposit thereon between about 50 and about 500 parts/wt. of over-polymerized SAN resin per 100 parts/wt. of said synthetic rubber in the said coagglomerated particles.

9. The method as defined in claim 8 and further characterized by the said butadiene-1,3 synthetic rubber being polybutadiene-1,3, the said hard, crosslinked copolymer being made from a monomeric mixture consisting of styrene and divinyl benzene, the said agglomerating step (3) being carried out by freezing the said blended latex/styrene mixture at a temperature between about −10° and about −30°C, and the said SAN resin being made from a mixture consisting of from about 60% to 75%/wt. of styrene and from about 40% to about 25%/wt. of acrylonitrile.

10. The method of claim 8 and further characterized by the said butadiene-1,3 synthetic rubber being polybutadiene-1,3 having a Mooney viscosity in the range of 70 to 100 ML at 212°F., by the said hard, crosslinked copolymer being made from a said monomeric mixture consisting of styrene and from about 1% to about 2%/wt. of divinyl benzene in the form of latex particles averaging from about 200 to about 400 A in diameter, said agglomerating step (3) being by freezing the said latex/styrene mixture at a temperature between about −10° and −30°C., and by said SAN resin being deposited from a mixture consisting of from about 60% to about 75%/wt. of styrene and from about 40% to about 25%/wt. of acrylonitrile.

* * * * *